June 6, 1950          S. B. WICZER          2,510,159

COMBINATION VOLUMETRIC BURETTE

Filed Oct. 6, 1944

Inventor

Sol B Wiczer

Patented June 6, 1950

2,510,159

UNITED STATES PATENT OFFICE 2,510,159

COMBINATION VOLUMETRIC BURETTE

Sol B. Wiczer, Washington, D. C.

Application October 6, 1944, Serial No. 557,471

4 Claims. (Cl. 222—158)

The present invention relates to a volumetric measuring device and in particular to a combination volumetric burette and vernier or microburette.

It is an object to construct a burette combined with a microburette whereby micro readings of intermediate calibrations are possible by transfer of fractional portions of large graduations of a volumetric burette to a microburette for accurate quantitative reading thereof.

It is another object to provide a combination of burette and microburette whereby titrations may be independently performed by each or a single titration performed by both for enhanced accuracy.

It is a further object to construct both burettes with completely automatic, self filling, zero reading features from a common reservoir bottle.

Other objects are inherent in the specific description and drawings as will be apparent to one skilled in the art.

In the drawings—

Figure 1:
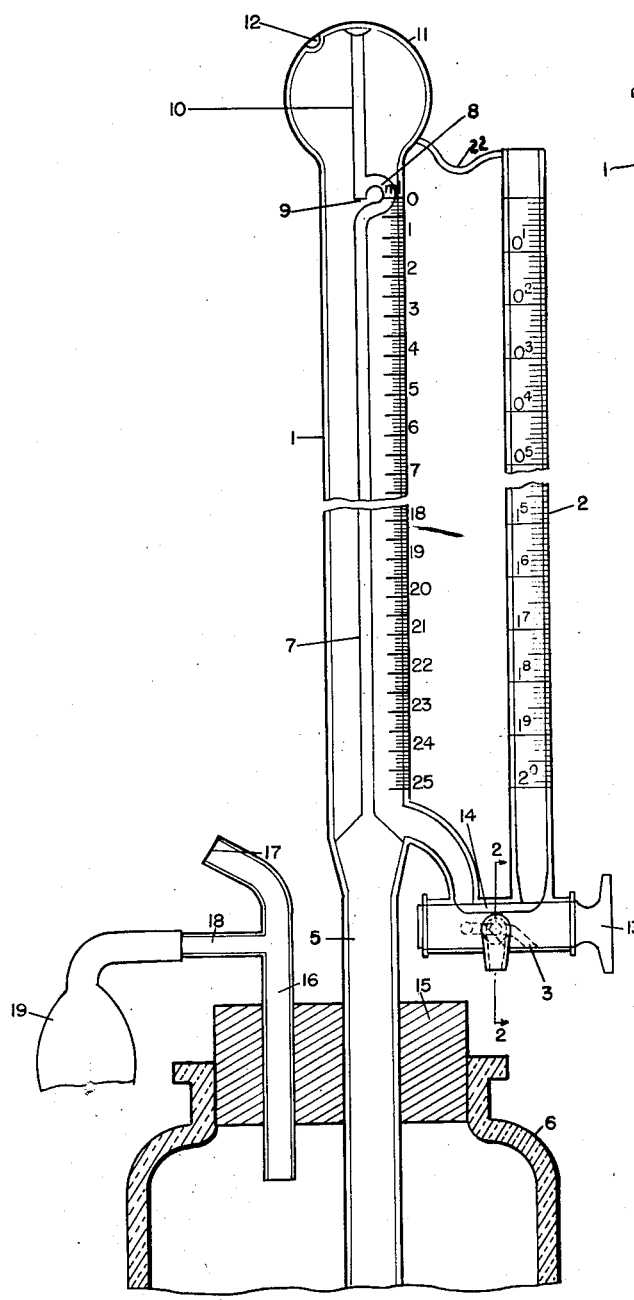
Fig. 1 shows an elevation of a form of a combination burette and microburette assembly exemplary of the present invention.

Referring to Figure 1, the large burette tube 1 is connected to the microburette 2 thru a three-way stop cock 3 for filling the microburette thru proper positioning of the stop cock. A common outlet 4 is provided to complete a titration from either burette depending also on proper positioning of the stop cock 3 as hereinafter explained. The burette 1 terminates in a tube 5 leading substantially to the bottom of a reservoir bottle 6, the tube 5 otherwise being strong enough to support the whole combination burette assembly and stop cock, but additional supports or clamps for the burette (not shown) may be used if desired. Thus any additional interconnecting supports or braces to provide rigidity such as the upper brace 22 may be used between the burettes. The tube 5 leading from the reservoir terminates in a thin capillary tube 7 passing centrally thru the large burette and is bent in a loop 8, opening in a downwardly pointed outlet 9 of a height fixed to correspond to the zero reading of both burettes. The tube outlet 9 leads thru the loop 8 for return of excess solution to the reservoir but a vertical support 10 is continued to the top of bulb 11 of the burette to provide a final support of the capillary tube 7, the effect of the loop 8 being not only to fix the zero position of the excess solution return thru outlet 9, but also to relieve any strain developed by the capillary with expansion or contraction with temperature variation which is otherwise rigidly fixed at both ends.

The stop cock is three-way, containing a duct 14, which may be a mere groove in the plug 13 serving when positioned as shown in the drawing to interconnect both burettes. Other ducts 20 and 21 serving as the plug 13 is turned to the proper angle to connect each burette in turn at independent plug angles to the outlet 4, thus enabling the operator by turning the plug 13 to connect the burettes respectively with the outlet or with each other or to stop all flow from either of the burettes.

Additional features essential only when the burette combination is intended to function with automatic filling comprise the air duct 16, fitted thru stopper 15, having an air vent 17 and an aspirator or blower bulb 19.

Figure 3:
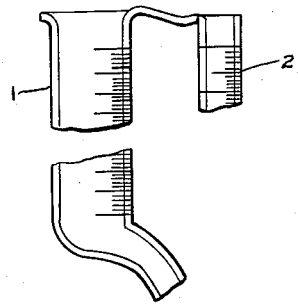
Fig. 3 shows a detail of the large volumetric burette having an open top wherein automatic filling is unnecessary.
Figure 4:
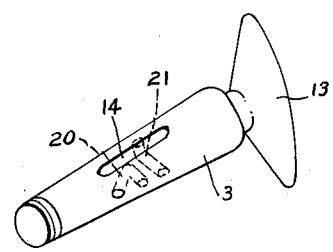
Fig. 4 shows a detail of the stop-cock and the construction of the internal passages therein.
Figure 2:
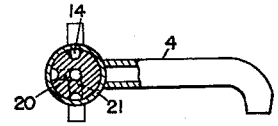
Figure 2 is a section thru the stop cock looking in the direction of the arrows on the line 2—2 of Figure 1.

There are several ways in which the burette of the present invention may be operated. By properly setting the stop cock to interconnect both burettes, both may, by addition of solution to the large burette, be filled to a commonly calibrated zero reading. This is done either automatically by closing vent 17 and forcing air into reservoir bottle 6 by squeezing the rubber bulb 19, thus forcing liquid from the reservoir bottle thru tube 5, capillary 7 thru opening 9 into burette 1, or where filling is not automatic and burette 1 is an ordinary open top burette in a modification within the scope of the present invention as shown in Fig. 3, the filling thereof may be by pouring liquid into the top as is usual. The invention is not dependent on automatic filling and the combination of burette and microburette may as mentioned, advantageously be used where other means are used for filling the same, the automatic filling being shown only as an additional advantageous feature and as a specific embodiment of one construction that may be used if desired, and it will be understood that both burettes may be open at the top, without automatic filling and the common reservoir and internal tube may be omitted and the combined burettes otherwise supported as with conventional burette clamps (not shown).

Thus in operation the large burette may first be used for an ordinary titration to a desired end point. Then, in order to accurately read the exact quantity of solution which has been used for such titration, any fractional portion of a large graduation such as a fraction of a cubic centimeter of solution is transferred from the large burette to the microburette which, for this purpose will have been empty or if partially filled, whose reading will have been recorded prior to transfer thru the interconnecting duct 14 in the stop cock, and by difference, the exact fractional portion of a cubic centimeter of solution may be more accurately read from the microburette.

Where a titration is desired involving an extreme degree of accuracy or one which takes only a small quantity of liquid, the microburette may be used entirely for the titration.

Thus it will be seen that the burette of the present invention enables the operator to use the large or microburette at will, exercising initial judgment as to the degree of accuracy desired, or to use the same in combination to titrate rapidly with a large burette, but to read the same with a far greater degree of precision by the combined use therewith of the microburette.

The term microburette is intended to include a burette of much smaller size and greater accuracy than the large burette used, but is not to be interpreted as a burette of any particular size. Thus the microburette may vary in size from a fraction to several cubic centimeters, the outstanding characteristic being the fine accurate and easily readable micro calibrations vertically disposed an unusually great distance for easy reading of minute quantities of liquid. The large burette may vary from 10 to 100 cc. or even more, without departing from the spirit of the present invention.

Other features herein include the automatic self filling feature of both burettes from a common reservoir which greatly facilitates handling accurately of very small quantities of liquid.

An additional feature of the automatic burette is the bent internal tube designed to accurately set and maintain the zero point with a minimum variation with temperature and minimum development of strain on the internal tube due to expansion and contraction with temperature.

Various modifications hereof will suggest themselves to those skilled in the art. For example the exact size of the burettes and the number conveniently mounted in combination may be varied. Similarly, as to the stop cock, any method of joining the burettes thereto may be varied to suit convenience. For example the stop cock could be vertically disposed instead of horizontally. Finally the automatic filling may be modified to other systems well known in the art. Hence it will be understood that my invention may be applied with such modifications and is not to be limited to the specific constructions mentioned or in other ways except as defined in the claims herein.

I claim:

1. In combination a volumetric chemical analysis burette of relatively large volume, and a burette of relatively small volume, each comprising elongated transparent tubes and calibrated to a high degree of accuracy to measure the volume of liquid contained in each, a discharge spout communicating at the bottom with each burette and a multi-way valve controlling the flow of fluid alowing accurate transfer from one burette to the other in one of the valve positions and independently connecting in alternate valve positions the flow of fluid from each of said burettes with said discharge spout.

2. In combination a volumetric chemical analysis burette of relatively large volume, and a microburette, each comprising elongated transparent tubes and calibrated to a high degree of accuracy to measure the volume of liquid contained in each, a discharge spout communicating at the bottom with each burette and a multi-way valve controlling the flow of fluid allowing accurate transfer from one burette to the other in one of the valve positions and independently connecting in alternate valve positions the flow of fluid from each of said burettes with said discharge spout.

3. In combination a volumetric chemical analysis burette of relatively large volume, and a burette of relatively small volume, each comprising elongated transparent tubes and calibrated to a high degree of accuracy to measure the volume of liquid contained in each, said tubes having their calibrated volumes in fixed position to each other and having zero readings positioned such that when the tubes are connected for fluid transfer therebetween and one tube is filled to a zero reading, the level of the other tube will also be at the zero reading, a discharge spout communicating at the bottom with each burette and a multi-way valve controlling the flow of fluid allowing accurate transfer from one burette to the other in one of the valve positions and independently connecting in alternate valve positions the flow of fluid from each of said burettes with said discharge spout.

4. In combination a volumetric chemical analysis burette of relatively large volume, and a microburette, each comprising elongated transparent tubes and calibrated to a high degree of accuracy to measure the volume of liquid contained in each, a discharge spout communicating at the bottom with each burette, a multi-way valve controlling the flow of fluid allowing accurate transfer from one burette to the other in one of the valve positions and independently connecting in alternate valve positions the flow of fluid from each of said burettes with said discharge spout, and means connected with one of the burettes for automatically filling both burettes.

SOL B. WICZER.

REFERENCES CITED

The following references are of record in the file of this patent:

UNITED STATES PATENTS

| Number | Name | Date |
|---|---|---|
| 804,894 | Soderlund | Nov. 21, 1905 |
| 1,297,458 | Garvey | Mar. 18, 1919 |
| 1,702,898 | Heine | Feb. 19, 1929 |
| 1,794,215 | Titus | Feb. 24, 1931 |
| 1,993,001 | Geyer | Mar. 5, 1935 |
| 2,271,144 | McKay | Jan. 27, 1942 |
| 2,398,234 | Long | Apr. 9, 1946 |

FOREIGN PATENTS

| Number | Country | Date |
|---|---|---|
| 469,900 | France | June 3, 1914 |